United States Patent
Lilbert

(10) Patent No.: US 12,332,358 B2
(45) Date of Patent: Jun. 17, 2025

(54) METHOD FOR PROCESSING A RADIONAVIGATION SIGNAL GENERATED BY A SATELLITE

(71) Applicant: SAFRAN ELECTRONICS & DEFENSE, Paris (FR)

(72) Inventor: Arnaud Lilbert, Moissy-Cramayel (FR)

(73) Assignee: SAFRAN ELECTRONICS & DEFENSE, Paris (FR)

(*) Notice: Subject to any disclaimer, the term of this patent is extended or adjusted under 35 U.S.C. 154(b) by 418 days.

(21) Appl. No.: 18/012,097

(22) PCT Filed: Jun. 22, 2021

(86) PCT No.: PCT/FR2021/051129
§ 371 (c)(1),
(2) Date: Dec. 21, 2022

(87) PCT Pub. No.: WO2021/260315
PCT Pub. Date: Dec. 30, 2021

(65) Prior Publication Data
US 2023/0258816 A1    Aug. 17, 2023

(30) Foreign Application Priority Data
Jun. 22, 2020   (FR) ...................... 2006070

(51) Int. Cl.
*H04L 1/06* (2006.01)
*G01S 19/21* (2010.01)
*G01S 19/39* (2010.01)

(52) U.S. Cl.
CPC ............ *G01S 19/21* (2013.01); *G01S 19/393* (2019.08)

(58) Field of Classification Search
CPC ........... H04W 4/40; G08G 3/02; B63B 43/18; B63B 49/00; G01S 19/21; G01S 19/391; G01S 19/215; G01S 19/22; G06N 3/0464
See application file for complete search history.

(56) References Cited

U.S. PATENT DOCUMENTS

| | | | |
|---|---|---|---|
| 2001/0012775 A1* | 8/2001 | Modzelesky | ......... H04W 12/06 455/430 |
| 2016/0103226 A1* | 4/2016 | Inoue | ................... G08G 1/0133 342/357.35 |

FOREIGN PATENT DOCUMENTS

WO    WO 2012/105747 A1    8/2012

OTHER PUBLICATIONS

Borio., "Swept GNSS Jamming Mitigation through Pulse Blanking", 2016 European Navigation Conference (ENC), May 30, 2016, pp. 1-8.

(Continued)

*Primary Examiner* — Phuoc H Doan
(74) *Attorney, Agent, or Firm* — BIRCH, STEWART, KOLASCH & BIRCH, LLP

(57) ABSTRACT

The invention relates to a method for processing a radionavigation signal generated by a satellite (SAT), said method comprising the following steps implemented in a processing unit of a radionavigation receiver: converting (102) the radionavigation signal into the frequency domain by means of a complex Fourier transform so as to obtain a frequency-domain radionavigation signal comprising a real part I and an imaginary part Q, the real part I having an amplitude I2 associated with one frequency; determining (103) a distribution law of the amplitude I2 of the real component I of the frequency-domain radionavigation signal; determining (104) an amplitude of the real component for which the distribution function is zero, said amplitude defining a threshold; processing (105) the frequency-domain radion- (Continued)

avigation signal so as to filter components the amplitude of which is higher than the determined threshold.

6 Claims, 3 Drawing Sheets

(56) References Cited

OTHER PUBLICATIONS

Capozza et al., "A Single-Chip Narrow-Band Frequency-Domain Excisor for a Global Positioning System (GPS) Receiver", IEEE Journal of Solid-State Circuits, vol. 35, No. 3, Mar. 2000, pp. 401-411.
French Search Report for French Application No. 2006070, dated Mar. 8, 2021.
International Search Report and Written Opinion of the International Searching Authority for International Application No. PCT/FR2021/051129, dated Oct. 6, 2021.

\* cited by examiner

METHOD FOR PROCESSING A RADIONAVIGATION SIGNAL GENERATED BY A SATELLITE

GENERAL TECHNICAL FIELD

The invention relates to global navigation satellite and relates in particular to a method and a device for processing signals in a global navigation satellite system.

STATE OF THE ART

In the Global Navigation Satellite System or GNSS (GPS, GLONASS, etc.), resistance to interference is an essential element of the performance of these systems.

Particularly, global navigation satellite receivers implement a correlation between a measurement signal (coming from satellites) (hereinafter GNSS signal) and a replica signal and processing operations that allow reducing interferences in the measurement signal before it is correlated with the replica signal. These processing operations are generally called: pre-correlative interference cancellation processing operations.

For some types of pre-correlative interference cancellation processing, it is necessary to estimate the Gaussian noise power for separating on the one hand the GNSS signals buried in the noise and on the other hand the interferences whose power is higher than Gaussian noise. This separation is used in particular in the frequency filtering techniques of the frequency excision or amplitude blocking type, for which a good estimation of the Gaussian noise power is essential.

This estimation of the Gaussian noise power is not easy and particularly for receiving GNSS signals. Indeed, all these signals are present at the same time; the interference is 100 to 1,000 times stronger than noise, itself 1,000 times stronger than the GNSS signal.

Furthermore, in the context of a GNSS receiver, this power should be estimated by using few digital resources given the miniaturization of the receivers.

PRESENTATION OF THE INVENTION

The invention allows separating a useful GNSS signal from interference in a simple manner.

To this end, the invention proposes, according to a first aspect, a method for processing a radionavigation signal coming from a satellite, said method comprising the following steps implemented in a processing unit of a radionavigation receiver:
- converting the radionavigation signal into the frequency domain by means of a complex Fourier transform so as to obtain a frequency radionavigation signal comprising a real part I and an imaginary part Q, the real part I having an amplitude $I^2$ associated with a frequency;
- determining a distribution law $I^2$ of the amplitude of the real component I of the frequency radionavigation signal;
- determining an amplitude of the real component for which the distribution function is canceled, said amplitude defining a threshold;
- processing the frequency radionavigation signal so as to filter the components whose amplitude is greater than the determined threshold.

The invention is advantageously completed by the following characteristics, taken alone or in any one of their technically possible combination:
- the processing of the frequency radionavigation signal can comprise a frequency excision, the processing consisting in removing the components whose amplitude is greater than the determined threshold;
- the processing of the frequency radionavigation signal can comprise an amplitude blocking;
- the determination of the distribution law consists in obtaining a histogram of the amplitude of the real component;
- the method further comprises a conversion of the frequency radionavigation signal in which the components whose amplitude is greater than the determined threshold are removed in the time domain by means of a complex inverse Fourier transform so as to obtain a processed radionavigation signal.

The invention proposes, according to a second aspect, a computer program product comprising program code instructions for the execution of the steps of a method according to the first aspect of the invention, when this program is executed by a computer.

The fact of considering in the method only the real part allows obtaining a method that requires less resource than a solution that would be based on the real and imaginary parts.

PRESENTATION OF THE FIGURES

Other characteristics, aims and advantages of the invention will emerge from the following description, which is purely illustrative and not limiting, and which should be read in relation to the appended drawings in which.

In all the figures, similar elements bear identical references.

DETAILED DESCRIPTION

Figure 1:
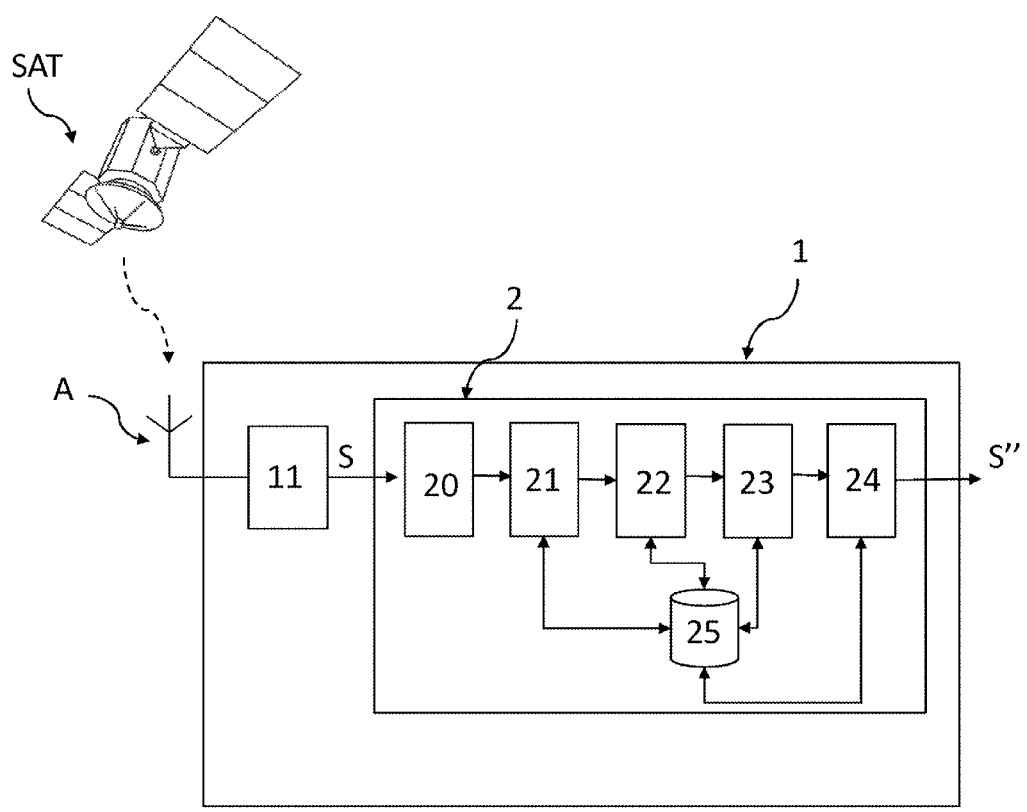
FIG. 1 illustrates a receiver of signals coming from a satellite according to the invention.

FIG. 1 illustrates a radionavigation receiver 1, hereinafter a GNSS receiver, comprising a receiving unit 11 configured to acquire a radionavigation signal (hereinafter GNSS signal) coming from a satellite SAT, for example of the GPS or GLONASS type, and convert it into a digital GNSS signal. The receiving unit 11 comprises in particular an antenna A and an analog-digital converter (not represented) to obtain a digital signal S at the output of the receiving unit 11. The receiving unit 11 comprises other elements that will not be described in more detail because they are well known to those skilled in the art.

The GNSS receiver 1 comprises a processing unit 2 to which the receiving unit 11 communicates the digitized GNSS signal S (hereinafter the GNSS signal). The processing unit 2 consists of one or several processors that will allow implementing different processing operations.

The received and digitized GNSS signal comprises a useful signal emitted by the satellite SAT, a Gaussian white noise and interference to be canceled.

The processing unit 2 comprises a module 20 for cutting the GNSS signal into blocks of samples of predetermined size.

The processing unit 2 comprises a time/frequency converter 21 configured to convert the GNSS signal into the frequency domain, the GNSS signal being in the time domain. Particularly, the converter 21 allows applying a complex Discrete Fourier Transform (DFT).

Following the converter 21, the receiver 1 comprises an interference cancellation module 22 configured to implement a certain number of processing operations on the frequency signal coming from the converter 21. These steps will be detailed later. This module 22 provides a frequency signal in which the interference has been canceled to a frequency/time converter 23 which is configured to convert this signal into the time domain. Particularly, the converter 23 allows applying an inverse complex discrete Fourier transform to the one applied by the converter 21.

This time signal is then provided to a correlation unit 24 which allows applying processing operations to the time signal in order to provide the navigation signal as known to those skilled in the art.

The processing unit 2 also comprises a memory 25 which allows storing signals during the different processing operations.

Figure 2:
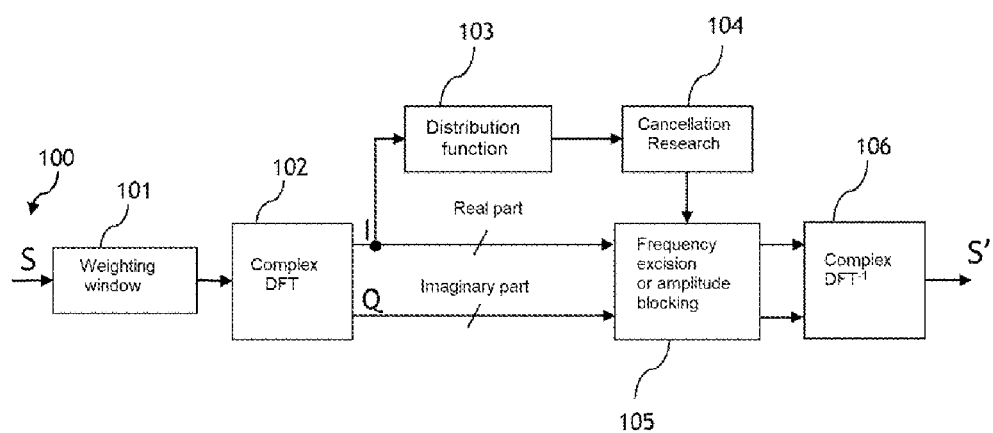
FIG. 2 illustrates a method for processing signals coming from a satellite according to the invention.

FIG. 2 illustrates steps of a method for processing GNSS signals coming from a satellite implemented by the processing unit 2.

First, a signal coming from a satellite is received and digitized by the receiver 1 (step 100) to obtain the GNSS signal denoted S.

The digitized GNSS signal S comprising a useful signal emitted by the satellite SAT, a Gaussian white noise and interference to be canceled is first windowed (step 101) and cut into blocks of several samples on which a complex DFT (step 102) is applied to obtain a frequency signal.

The windowing has the effect of limiting the spectral diffusion resulting from the complex DFT and linked to the time truncation. An example of windowing is of the Blackman-Harris type.

At the end of the complex DFT, the frequency signal comprises N samples of indices 1 to N, N being a multiple of 2, for example:

$$256 \leq N \leq 1,024.$$

In the case of a complex DFT, the frequency signal comprises a real part (component in phase I) and an imaginary part (component in quadrature Q). Furthermore, the signal comprises N samples describing the real part (denoted $I_i$, i=1 to N) and N samples describing the imaginary part (denoted $Q_i$).

Then, as can be seen in FIG. 2, a function of distribution of the amplitude of the real part of the frequency signal is determined (step 103). The determination of this distribution function consists in calculating the amplitude $I_i^2$ of each sample Ii of the real part and classifying them by level to obtain a histogram of the number of samples presenting a certain amplitude value.

The step of the histogram is constant and is for example equal to 1.

Figure 3A:
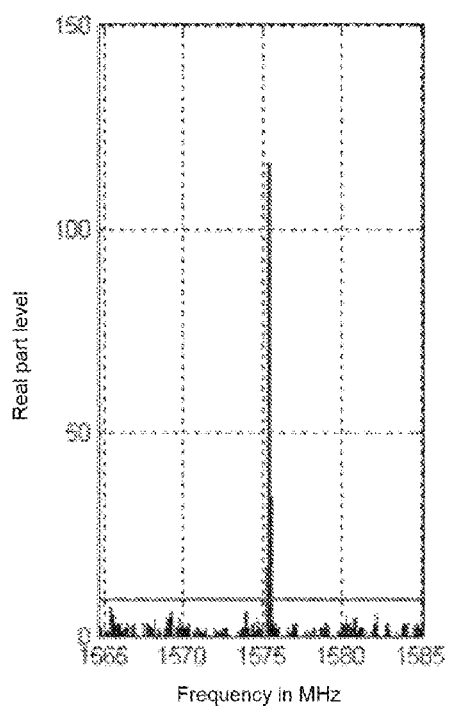
FIGS. 3a and 3b illustrate representations of a frequency signal obtained during the method according to the invention.
Figure 3B:
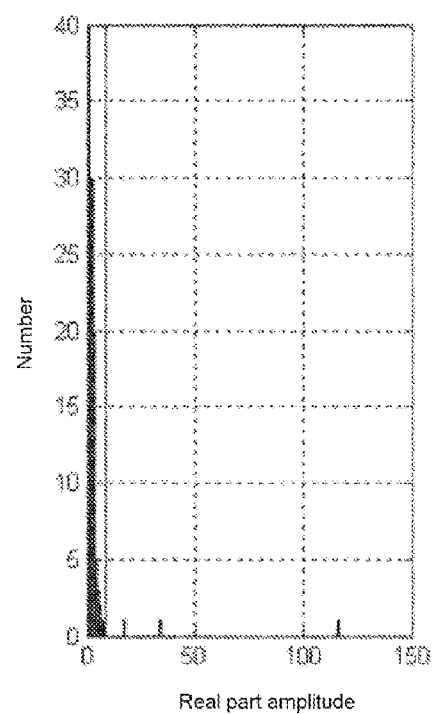

An example of such a distribution function is illustrated in FIG. 3b.

From the distribution function obtained, the amplitude of the real part for which the distribution function is canceled is determined (step 104). This determined amplitude corresponds to a threshold so that the samples whose real part amplitude is greater than this threshold are noise levels.

FIG. 3a illustrates the amplitude of the real part as a function of the frequency, the corresponding distribution function being illustrated in FIG. 3b.

In this example, the spectrogram represents a GPS C/A signal buried in the Gaussian noise in the presence of CW interference centered on the frequency L1. The estimation of the noise power is deduced from the level for which the histogram is canceled, here the value is represented by the threshold=9.

Everything above this threshold is noise and it is therefore observed that only the low-amplitude levels correspond to the signal with only Gaussian noise because they correspond to the Gaussian noise whose distribution follows a centered normal type law.

Then, the frequency signal is processed so as to filter or remove its components whose real part amplitude is greater than the determined threshold (step 105).

The signal thus processed is then converted into a time signal via the application of a complex inverse transform (complex $DFT^{-1}$) on this signal (step 106).

A signal S' is then obtained. It is this signal that then allows obtaining the navigation signal S".

According to one embodiment, the processing on the frequency signal in step 105 can consist of a frequency excision on this signal. Such processing consists in canceling the frequency components for which the amplitude of the real part is greater than the threshold determined in step 104. The cancellation of the frequency components is implemented on the real and imaginary parts.

According to another embodiment, the processing on the frequency signal in step 105 can consist of an amplitude blocking.

According to this embodiment, unlike the cancellation of the frequency components, the amplitude blocking consists in setting the amplitude in the frequency range of the interference while preserving its phase. The set amplitude value can be chosen to: maximize the signal-to-noise ratio; take into account the percentage of frequency components to be processed; preserve the spectral representation of the signal (advantageous variant) in order to limit the distortion contribution in the rest of the processing.

The invention claimed is:

1. A method for processing a radionavigation signal coming from a satellite wherein a processing unit of a radio navigation receiver implements the following steps:
converting a radionavigation signal coming from a satellite into the frequency domain by means of a complex Fourier transform so as to obtain a frequency radionavigation signal comprising a real part I and an imaginary part Q, the real part I having an amplitude $I^2$ associated with a frequency;
determining a distribution law $I^2$ of the amplitude of the real component I of the frequency radionavigation signal;
determining an amplitude of the real component for which the distribution function is canceled, said amplitude defining a threshold;
processing the frequency radionavigation signal so as to filter the components whose amplitude is greater than the determined threshold.

2. The method according to claim 1, wherein the processing of the frequency radionavigation signal comprises a frequency excision, the processing consisting in removing the components whose amplitude is greater than the determined threshold.

3. The method according to claim 1, wherein the processing of the frequency radionavigation signal comprises an amplitude blocking.

4. The method according to claim 1, wherein determining the distribution law consists in obtaining a histogram of the amplitude of the real component.

5. The method according to claim 1, comprising a converting the frequency radionavigation signal in which the components whose amplitude is greater than the determined threshold are removed in the time domain by means of a complex inverse Fourier transform so as to obtain a processed radionavigation signal.

6. A non-transitory computer readable medium comprising code instructions for executing the method according to claim 1, when said program is executed on a computer.

* * * * *